W. CLIFFORD.
SEPARATION AND SETTLEMENT OF SOLIDS AND MATTERS FROM SEWAGE AND OTHER LIQUIDS.
APPLICATION FILED MAR. 27, 1918.
1,343,764. Patented June 15, 1920.
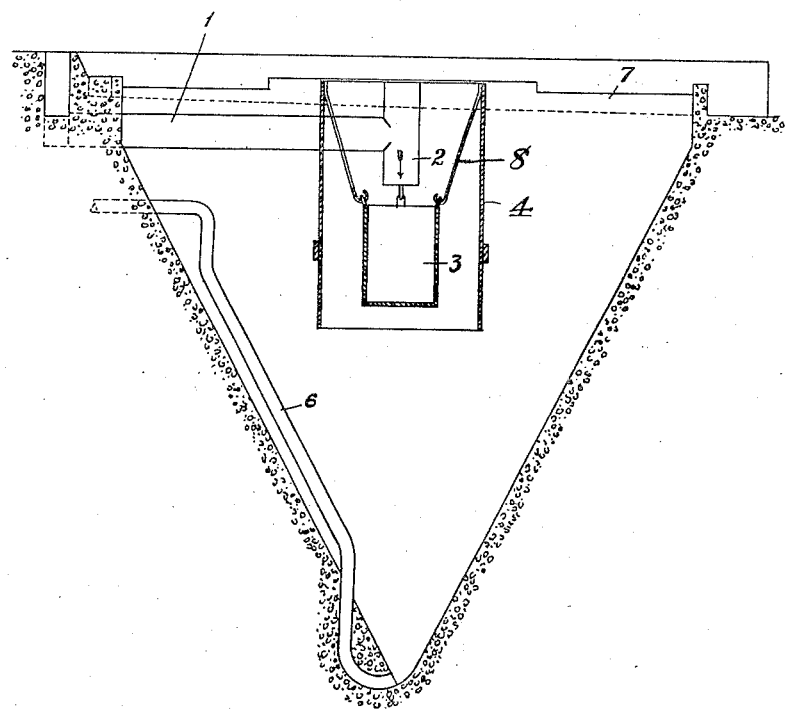
Inventor
William Clifford.
Attorney.

UNITED STATES PATENT OFFICE.

WILLIAM CLIFFORD, OF OXLEY, WOLVERHAMPTON, ENGLAND, ASSIGNOR TO JONES & ATTWOOD LIMITED, OF AMBLECOTE, STAFFORD, ENGLAND.

SEPARATION AND SETTLEMENT OF SOLIDS AND MATTERS FROM SEWAGE AND OTHER LIQUIDS.

1,343,764.  Specification of Letters Patent.  Patented June 15, 1920.

Application filed March 27, 1918. Serial No. 225,050.

*To all whom it may concern:*

Be it known that I, WILLIAM CLIFFORD, a subject of the King of England, residing at Oxley, Wolverhampton, in the county of Stafford, England, have invented new and useful Improvements in and Connected with the Separation and Settlement of Solids and Matters from Sewage and other Liquids, of which the following is a specification.

This invention has reference to the separation and settlement from liquids dealt with at sewage, or analogous liquid disposal works, or from chemical and like manufacturing liquids, of the suspended matters from such liquids; and it is directed more especially to the separation and settlement of such substances from the liquids which have a specific gravity little greater than that of water, or which are light and of a character readily disturbed, and settlement whereof is impeded or prevented by currents in the liquid; at the same time, it is applicable to the treatment for separation of any liquids of the above character; but for convenience it will be described as applied to the separation of sludge from sewage or like liquids.

The invention has primarily for its object to provide improvements hereinafter described in the settlement or separation of suspended matters from sewage liquids, or chemical and like manufacturing liquids, and especially in cases where the suspended matters are relatively light or flocculent, such for instance, as the sludge resulting from the purification of sewage or like liquids by the process known as the "activated sludge process;" and it may be applied to systems wherein the flow of liquid to be treated and the discharge of separated water is continuous, and also to settlement tanks working on the fill-and-draw principle to secure the more rapid quiescence of their contents.

I have ascertained by a large number of experiments with the activated sludge process, that the sludge produced is extremely prone to disturbance when settled, and that in settling tanks slight eddies or movement near it disturb and retard settlement of suspended matters, so that it is difficult to obtain a complete separation and prevent particles of such sludge passing away with the effluent. I have found that freshly activated sludge contains particles of extreme flocculence of a density only very slightly greater than water, and thus very difficult to settle; and even gentle current eddies will prevent these particles from being precipitated; and heretofore, it was found at times that particles of the sludge were passing away with the effluent, due no doubt to obscure movements of small eddies due to causes such as the manner and direction of introduction of the liquid into the settling tank, and the flow, or changes of direction of flow in the tank.

Thus the conditions under which the complete separation of sludge from water, and a pure effluent can be brought about and exist; and on the other hand an imperfect separation, and slightly imperfect effluent exist, may differ to only a very small extent, and that such an alternative condition is a matter of great nicety of the flow-controlling means, guidance of the liquid, and manner of introduction into and flow through the tanks; but the control and accomplishment of the requisite conditions to produce the required and necessary result are nevertheless effected by simple, yet definite and small factors and means, arranged in definite ways or manners, which result in the production of a definite manner of flow and behavior of the liquid in passing through the tank.

For convenience, the form of tank in connection with which the invention will be first described, will be one having an inverted conical or pyramidal bottom, with or without short vertical walls, and a central downflow inlet pipe.

In sewage disposal works, the liquid from which the solids or matters are to be settled and separated, is very generally delivered into the tank in a stream or streams at an average velocity of about from say 1 to 1½ feet per second. The effect of this velocity, especially in tanks with tangentially or specially arranged inlet ducts, is to start the main body of liquid into motion, and keep it in motion, and particularly in cases where the solids or matters are relatively light, this motion is inimical to the proper settlement. In practice I have found that the stream of liquid in flowing down the pipe into the tank, although not visible to the eye from above, does in fact, extend a long way down into the body of liquid; and with liquids of the character referred to it has the effect of disturbing the sediment—at or near the bottom of the tank, and starting the main body of liquid into motion, with the effect, that sedimentation or settlement of the solids or matters is not so complete and the effluent is not of the purity required.

This action and the effect of the continuance of the flow of the influent into the body of the liquid is under this invention prevented, and the method of accomplishing it consists in breaking up the inflowing stream where it enters the tank, and producing a distributed and relatively slow and quiet form of flow in a relatively large body of liquid; in some cases, causing it to eddy on itself at a suitable position intermediate the top and the bottom of the tank.

Different forms of devices or contrivances may be employed for effecting this method of breaking up or converting the columnar and relatively rapid flow of the incoming liquid to a diffused or distributed, slow and quiescent flow, which will depend upon the form of tank in which the method of settlement is to be carried on, and other conditions of application; but in a tank of the character above described, having a central down flow inlet, an advantageous means of accomplishing the effect described is that illustrated in the figure of the accompanying drawing, which shows a tank adapted to operate according to the invention.

In this tank, 1 is the inlet conduit, having a vertical delivery portion 2 on its end disposed in the center of the tank, directing the flow of liquid in a downward direction, and toward the bottom; the shape of the tank being coned or tapered inward, downward, and of rectangular, circular, or other suitable form. In this tank, the means of accomplishing the effect described consists of a cup-shaped bucket or eddy vessel 3 in front of the inlet orifice 2, into which the inflowing liquid enters, and which has a considerably larger sectional area, say from 3 to 8 times the area of the inlet orifice 2. The effect of this means is that the direction of flow is practically reversed, and the columnar flow is broken up, and eddies are created; and energy of the liquid is partly dissipated in eddies, and partly diffused in the greater mass of liquid immediately above the vessel 3.

The liquid on emerging from the upper part or lip of the cup-vessel 3 has in general an upward and spreading action, and this action is controlled and limited by the employment of an outer guard device or wall 4 of cylindrical or other suitable shape, which surrounds the vessel 3; and in the case shown this guard device is open above and below, and extends from above the liquid or surface (or it may be below it) to a plane say ¼ to ½ of the depth of the tank; and it is advantageous that this inclosing device should be relatively large, and have an area in cross section, say 3 to 8 times the area of the inner vessel 3, the most advantageous area depending among other conditions, on the average velocity of the liquid entering by the inlet pipe 2. The eddy vessel 3 is preferably supported from the outer guard device 4, as by hangers 8. The upward motion of the liquid from the vessel 3 is limited by the surface of the liquid within the guard vessel 4, which as shown extends above it (but the limit may be controlled by a cover in the cylinder 4 which may be below the level), and is deflected downward with a slow and practically uniform velocity, and emerges therefrom without any disturbing effect upon the deposited sludge and sludge-liquid in the lower portion of the tank. The sludge is carried off from the lower portion of the cone bottom of the tank by a pipe 6.

Having produced the condition referred to, the liquid slowly and quietly, without disturbance, flows up through the larger area of the upper part of the tank outside the guard chamber 4, and is freed of all sludge or solids (provided the rate of inflow is suitable) by the time it reaches the upper portion, whence it passes away over the weir 7 on the outer margin of the tank, which may constitute a continuous weir, or be gapped as shown.

What is claimed is:—

1. A settling tank, an inflow pipe, a guard about the delivery end of said pipe and comprising a cylindrical casing of uniform diameter throughout with open ends above and below said inflow pipe, and a vessel closed at bottom and open at top arranged centrally within and wholly above the lower end of the guard, the inflow pipe directing the material into the open end of said vessel.

2. A settling tank, an inflow pipe, a guard about the delivery end of said pipe and comprising a cylindrical casing of uniform diameter throughout with open ends above and below said inflow pipe, and a vessel closed at bottom and open at top arranged centrally within and wholly above the lower end of the guard, and means for suspending the vessel from the guard.

In testimony whereof I have signed my name to this specification in the presence of two subscribing witnesses.

WILLIAM CLIFFORD.

Witnesses:
ERNEST HARKER,
DAVID C. KERR.